No. 783,344. PATENTED FEB. 21, 1905.
A. P. WISBORG.
LAWN MOWER.
APPLICATION FILED NOV. 19, 1904.

2 SHEETS—SHEET 1.

Witnesses
E. H. Reichenbach
E. M. Colford

Inventor
A. P. Wisborg
by
Chandlee Chandlee
Attorneys.

No. 783,344. PATENTED FEB. 21, 1905.
A. P. WISBORG.
LAWN MOWER.
APPLICATION FILED NOV. 19, 1904.
2 SHEETS—SHEET 2.
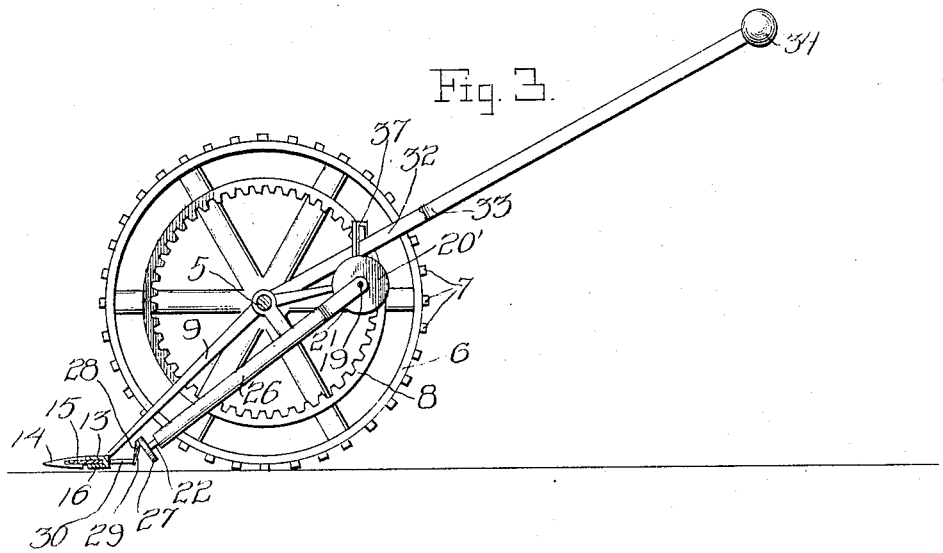
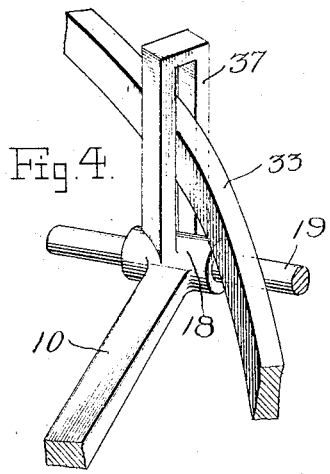
Witnesses
O. K. Reichenbach
E. M. Colford
Inventor
A P Wisborg
by
Attorneys.

No. 783,344.

Patented February 21, 1905.

UNITED STATES PATENT OFFICE.

ANDERS P. WISBORG, OF SAVONBURG, KANSAS.

LAWN-MOWER.

SPECIFICATION forming part of Letters Patent No. 783,344, dated February 21, 1905.

Application filed November 19, 1904. Serial No. 233,459.

*To all whom it may concern:*

Be it known that I, ANDERS P. WISBORG, a citizen of the United States, residing at Savonburg, in the county of Allen and State of Kansas, have invented certain new and useful Improvements in Lawn-Mowers; and I do hereby declare the following to be a full, clear, and exact description of the invention, such as will enable others skilled in the art to which it appertains to make and use the same.

This invention relates to lawn-mowers; and it has for its object to provide a construction embodying a cutter-bar and a reciprocatory knife-bar provided with knives and in which this cutter mechanism will be actuated with a high efficiency.

A further object of the invention is to provide a mower which will permit the cutter mechanism to be raised above the ground, so as to avoid obstruction that would interfere with its operation.

Other objects and advantages of the invention will be understood from the following description.

Figure 1:
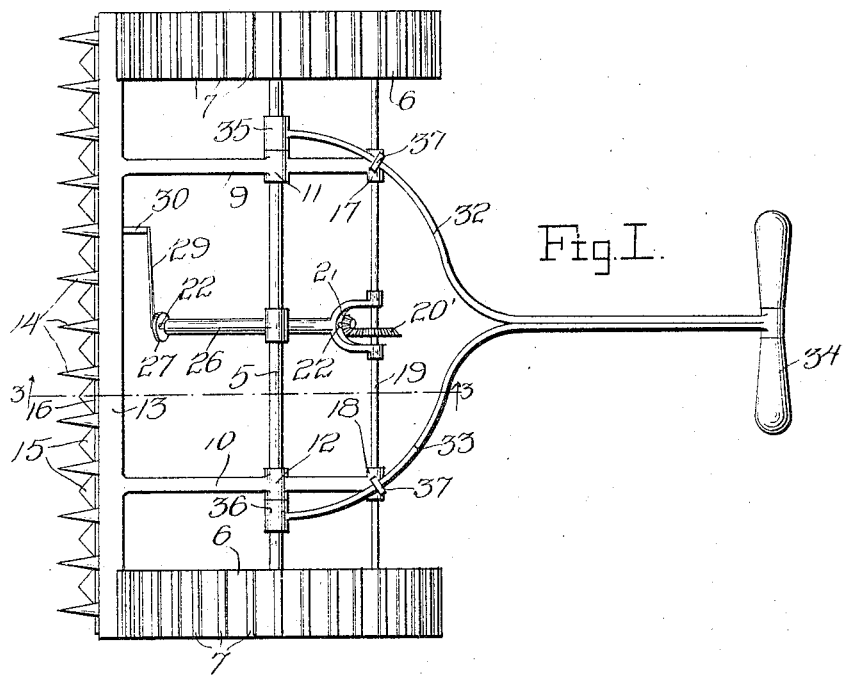
Figure 2:
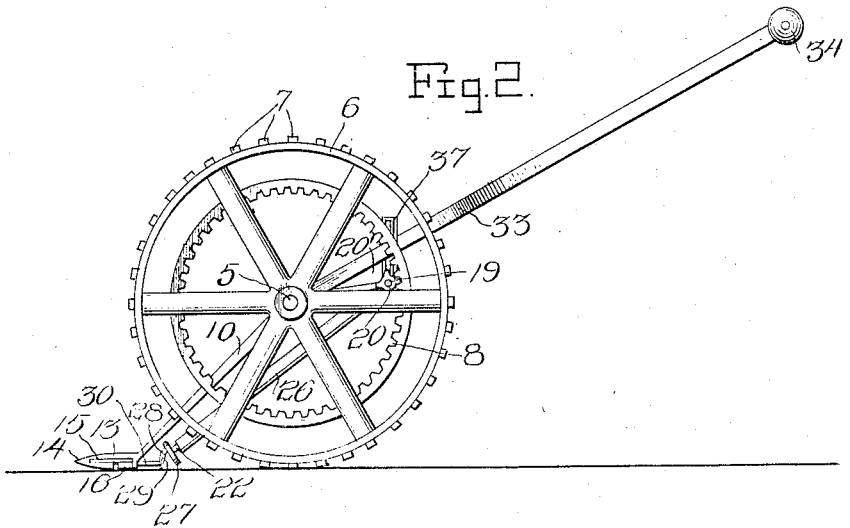

In the drawings forming a portion of this specification, and in which like numerals of reference indicate similar parts in the several views, Figure 1 is a top plan view showing a mower embodying the present invention. Fig. 2 is a side elevation of the mower. Fig. 3 is a section on line 3 3 of Fig. 1. Fig. 4 is a detail view showing one of the bearings with the handle and braces thereon.

Referring now to the drawings, there is shown a lawn-mower comprising an axle 5, upon the ends of which are fixed the ground-wheels 6, having peripheral cogs 7, which insure proper traction to actuate the cutting mechanism, hereinafter described. The wheels 6 are provided with internal gear-teeth 8 for a purpose to be presently explained. A supporting-frame for the cutting mechanism comprises arms 9 and 10, having bearings 11 and 12, in which the shaft 5 is received, these arms extending both forwardly and rearwardly of the shaft, as illustrated. To the forward ends of the arms 9 and 10 is connected a cutter-bar or finger-bar 13, having forwardly-directed fingers 14, in connection with which are employed knives 15, carried by a knife-bar 16, to cut the grass.

The rearwardly-extending portions of the arms 9 and 10 are provided with bearings 17 and 18, in which is journaled a shaft 19, having pinions 20 at its ends, which engage the gear-teeth 8, respectively. Upon the shaft 19, between the bearings 17 and 18, is fixed a bevel gear-wheel 20', with which is engaged a bevel-pinion 21 upon a shaft 22, which extends forward beyond the axle 5 and is journaled in a casing 26, mounted upon the axle 5 and connected with the shaft 19. At the forward end of the shaft 22 is a crank-disk 27, to the crank-pin 28 of which is connected a pitman 29, which is connected in turn to the arm 30, that is carried by and projects rearwardly from the knife-bar. In this manner the knife-bar is reciprocated as the machine advances.

A handle is provided and comprises the bars 32 and 33, which at their rear ends are connected to a cross-bar or grip 34, the forward ends of the bars 32 and 33 being provided with bearings 35 and 36, in which the axle 5 is received. Braces 37 connect the bars 32 and 33 with the bearings 17 and 18, the bars 32 and 33 being passed through slots in the braces, so that the handle may have slight vertical lost motion, and yet when pressed downwardly to a sufficient extent will serve to raise the cutter mechanism off from the ground to avoid obstructions.

What is claimed is—

A lawn-mower comprising traction-wheels, a shaft for the traction-wheels, said wheels being provided with gears, arms having bearings in which the axle is received, said arms projecting forwardly and rearwardly of the axle, bearings at the rear ends of the arms, a shaft mounted in the last-named bearing and having pinions engaged respectively with the gears, a cutter-bar mounted at the forward ends of the arms and having fingers and adapted to rest upon the ground, a reciprocatory knife-bar upon the cutter-bar having knives disposed to coöperate with the fingers, a frame connected with the axle and shaft, a gear upon the shaft, a shaft mounted in the frame, a pinion carried by the last-named shaft and meshing with the gear of the first-named shaft, a crank-disk at the forward end of the second shaft, connections between the crank-disk and the knife-bar for reciprocating the latter, braces connected to the bearings at the rear ends of the arms, bars pivotally connected with the axle and connected with the braces for a degree of lost motion vertically with respect thereto, and a grip connected to the rear ends of the bars.

In testimony whereof I affix my signature in presence of two witnesses.

ANDERS P. WISBORG.

Witnesses:
WILLIAM K. BOOL,
WILLIAM E. MYER.